Sept. 15, 1970  R. HEANEY ETAL  3,529,169
PHOTOELECTRIC APPARATUS FOR DETECTING SHAPE OF BOTTLES
Filed Dec. 6, 1967  2 Sheets-Sheet 1

INVENTORS.
RICHARD HEANEY
GEORGE SARNACK
BY F. W. Anderson
C. E. Tripp
ATTORNEYS

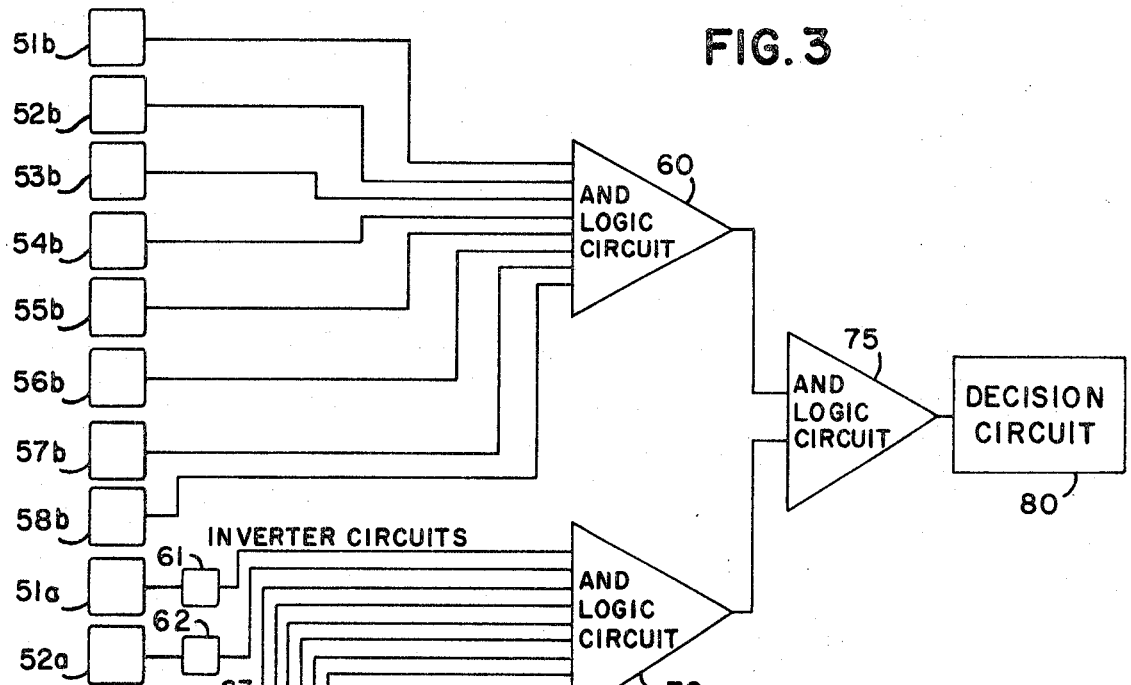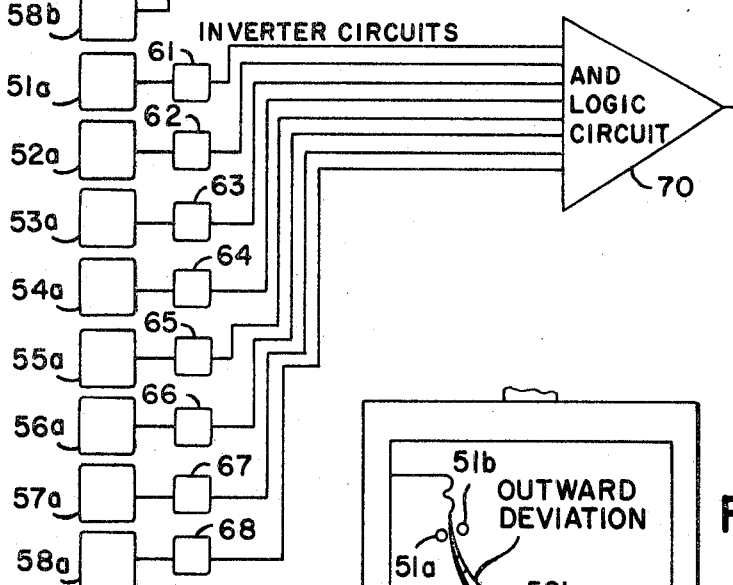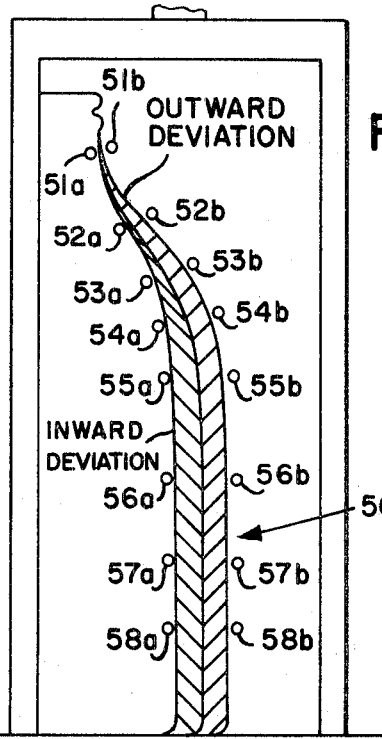

United States Patent Office 3,529,169
Patented Sept. 15, 1970

3,529,169
PHOTOELECTRIC APPARATUS FOR DETECTING
SHAPE OF BOTTLES
Richard Heaney, Campbell, Calif., and George Sarnack,
Henrietta, N.Y., assignors to FMC Corporation, San
Jose, Calif., a corporation of California
Filed Dec. 6, 1967, Ser. No. 688,457
Int. Cl. G06m 7/00
U.S. Cl. 250—223                                    4 Claims

ABSTRACT OF THE DISCLOSURE

The present invention relates to apparatus for inspecting the configuration of ware. Toward this end, ware, such as glassware, is advanced along a predetermined path and rotated about its vertical axis when the ware arrives at an inspection station. On one side of the path at the inspection station is positioned a suitable source of light, which is projected through the ware being rotated at the inspection station along an upwardly directed edge thereof. On the other side of the path and located at the inspection station is a vertically disposed array of light responsive devices. The light projected through the ware being rotated is cast in the direction of the array of light responsive devices for impingement thereon.

When light is projected through the rotating ware, a ware profile in the form of a shadow is cast on the array of light responsive devices. Such a shadow represents the configuration or profile of the ware. The array of light responsive devices, in turn, are arranged to detect both inward and outward deviations from a standard or desired shadow profile or a desired configuration of the rotating ware. Ware with no distortion or configuration defect will have a stationary pattern or a preselected shadow profile. On the other hand, a ware with distortion or with a configuration defect will produce a moving shadow or a nonconforming shadow profile. It is the array of light responsive devices that detects whether the configuration of the rotating ware conforms to preselected conditions and controls the operation of a decision circuit for either signalling the reject or accept status of the rotating ware or for controlling the operation of a reject or accept device disposed in the path of travel of the ware after the ware leaves the inspection station.

---

The present invention relates in general to apparatus for inspecting wares, and more particularly to apparatus for inspecting the configuration of a ware.

An object of the present invention is to provide apparatus for inspecting the configuration of ware which detects deviations of the shape of the ware.

Another object of the present invention is to provide apparatus for inspecting the configuration of ware which senses defects in the ware.

Another object of the present invention is to provide apparatus for inspecting the configuration of ware which detects inward and outward deviations in shape along an edge of the ware taken with respect to an acceptable profile.

Another object of the present invention is to provide apparatus for inspecting the configuration of ware wherein the space between associated light sensitive devices determines the allowable tolerances for deviations in configuration of the ware.

Other and further objects and advantages of the present invention will become apparent to one skilled in the art from the following description taken in conjunction with the accompanying drawings, in which:

FIG. 3 is a schematic diagram of circuits employed in the apparatus shown in FIG. 1.

FIG. 4 is an enlarged diagrammatic illustration of a shadow profile cast on the array of light sensitive devices by projecting light through a rotating ware along an upwardly directed edge thereof.

Briefly described, ware, such as glassware, is inspected for defects or deviations in shape by projecting light therethrough while the ware is rotating along an upwardly directed edge thereof. An array of light sensitive devices is disposed in the path of the light projected through the rotating ware to have a shadow profile cast thereupon. Such a shadow represents the configuration or profile of the rotating ware.

The array of light responsive devices are arranged to detect both inward and outward deviations taken with respect to a standard or desired shadow profile or a desired configuration of the rotating ware. It is the array of light responsive devices that detects whether the configuration of the rotating ware conforms to preselected conditions and controls through logic circuits the operation of a decision circuit for either signalling the reject or accept status of the rotating ware or for controlling the operation of a reject or accept device disposed in the path of travel of the ware after the completion of the inspection thereof.

Figure 1:
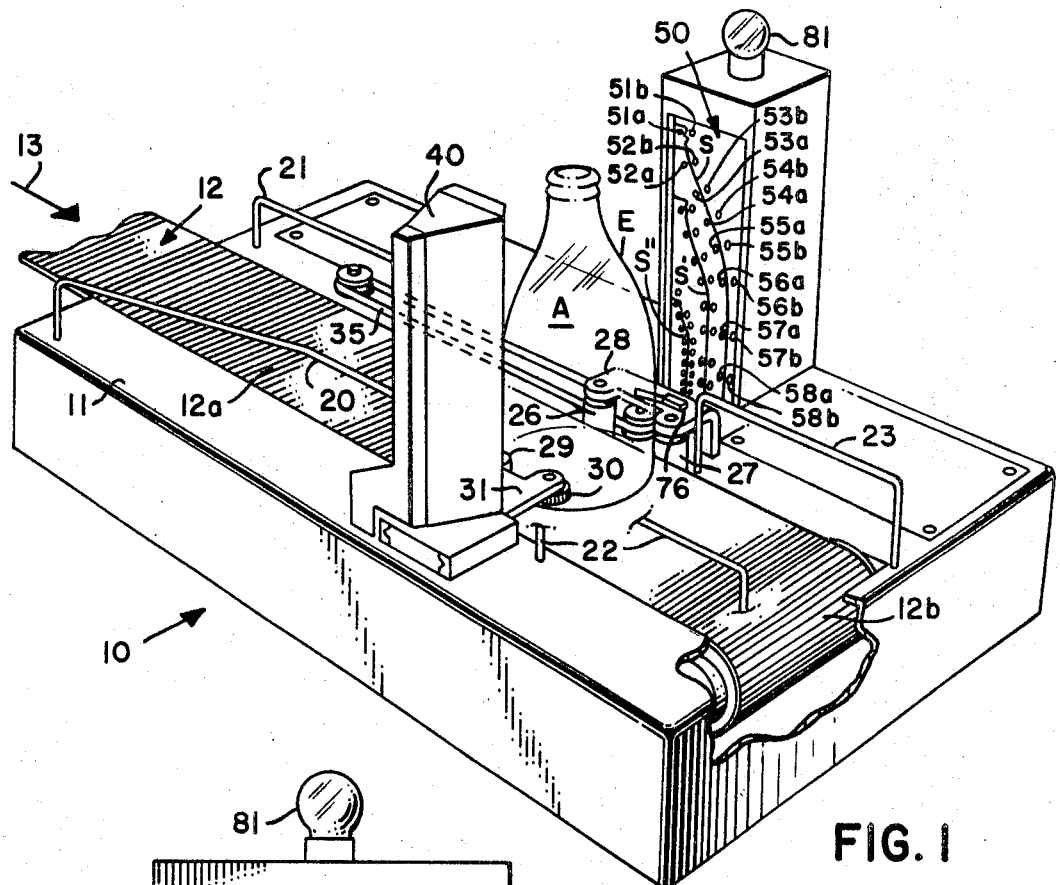
FIG. 1 is a perspective view of the apparatus of the present invention for inspecting the configuration of ware.

Illustrated in FIG. 1 is the apparatus 10 of the present invention for inspecting the configuration of ware, such as glassware A. The apparatus 10 comprises a suitable support 11. Mounted on the support 11 is a conventional conveyor 12 that advances articles, such as glassware A, in the direction of an arrow 13. In the exemplary embodiment, the conveyor 12 includes an endless steel mesh belt trained around a drive and driven roller. The conveyor 12 includes a ware advancing section 12a and a ware discharge section 12b. Between the advancing section 12a and the discharge section 12b of the conveyor 12 is located the inspection station. Guide rails 20 and 21 are attached to the support 11 along the conveyor section 12a to guide the ware in its travel toward the inspection station. Likewise, guide rails 22 and 23 are secured to the support 11 along the conveyor section 12b to guide the single file of ware in its travel away from the inspection station.

On one side of the inspection station in parallel relation with the conveyor 12 are guide rollers 26 and 27, which are mounted for rotation on a bracket 28. The bracket 28 is adjustably secured to the support 11 through an elongated transverse slot, not shown, so that it can be moved toward or away from the conveyor 12. On the opposite side of the inspection station in parallel relation with the conveyor 12 are guide rollers 29 and 30, which are mounted for rotation on a bracket 31. The bracket 31 is adjustably secured to the support 11 through an elongated transverse slot, not shown, so that it can be moved toward or away from the conveyor 12. As shown in FIG. 1, the guide rollers 26 and 29 are transversely aligned across the conveyor 12 and similarly the guide rollers 27 and 30 are transversely aligned across the conveyor 12.

Extending in the vicinity of the roller 26 so as to engage the peripheral wall of a ware on the conveyor 12 is an endless spin belt 35. It is to be observed that the spin belt 35 does not extend to the gauge surface of the ware to be tested. The belt 35 has its bottle engaging run travelling in the direction of the arrow 13 and serves to rotate the glassware A about its vertical axis while the ware is at the inspection station. Preferably, the spin belt 35 is disposed adjacent the ware advancing section 12a of the conveyor 12.

Ware, such as glassware A, is deposited on the conveyor section 12a of the conveyor 12 and is advanced to the inspection station. As the glassware A advances into the inspection station, the guide rollers 26 and 29 guide the glassware A centrally with respect to the inspection station and into engagement with the guide rollers 27 and 30, which, in turn, serve to locate the glassware A centrally in the inspection station and in nested relation with respect to the adjusted brackets 28 and 31. While the glassware A is at the inspection station, the guide rollers 26, 27, 29 and 30 along with the brackets 28 and 31 temporarily and momentarily delay the forward motion of the glassware A. While the glassware A is in the inspection station and its forward motion temporarily delay, the spin belt 35 rotates the glassware A about its vertical axis. The period of time for the rotation of the glassware A about its vertical axis is sufficient to enable the glassware A to be inspected in a manner to be described hereinafter. After the temporary delay of forward motion of the glassware A at the inspection station through the momentary forward motion impeding action by the rollers 26, 27, 29 and 30 along with the brackets 28 and 31, the conveyor 12 continues to advance the glassware A in the direction of the arrow 13. The section 12b of the conveyor 12 advances the glassware A either for segregation or to a succeeding station.

At the inspection station for the glassware A is located a suitably vertically disposed source of light 40, which projects a relatively narrow vertically disposed beam of light across the conveyor 12. The light source 40 is disposed adjacent one side of the conveyor 12 confronting the glassware A so as to cast light for illuminating the leading upwardly directed edge of the ware rotating about its vertical axis on the conveyor 12. For purposes of clarity, the leading upwardly directed edge is designated E in FIG. 1. It is apparent that the rearward upwardly directed edge can be employed equally as well. In this instance, however, the spin belt would be adjacent the discharge section 12b of the conveyor 12.

Confronting the source of light 40 from the opposite side of the conveyor 12 and in transverse alignment with the light source 40 across the conveyor 12 is an array of light sensitive devices 50, which comprises photocells 51a–58a and 51b–58b. Photocells which are relatively small in size and which have relatively narrow sensing areas are preferably employed. Such photocells may be found in microelectronic reading devices and solid state reading devices and also may be in the form of phototransistors. The forwardmost portions of the photocells confronting the glassware to be inspected are disposed in a vertical plane parallel to the direction of travel of the ware on the conveyor 12.

Figure 2:
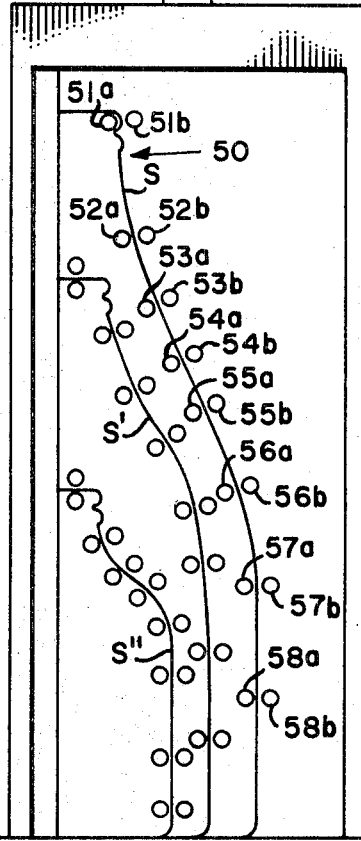
FIG. 2 is an enlarged elevational view of the array of light sensitive devices embodied in the apparatus shown in FIG. 1 for detecting the presence of defects or deviations in the ware.

As shown in FIGS. 1 and 2, the photocells 51a–58a and 51b–58b are identified in pairs. For example, photocells 51a and 51b are considered a pair. Similarly, photocells 52a and 52b are considered a pair. Still another pair of photocells is photocells 53a and 53b. Thus, there are in the exemplary embodiment eight pairs of photocells 51a–51b through 58a–58b. For purposes of illustration, a line S may be drawn connecting points intermediate each pairs of photocells. Such a line S represents the standard or desired configuration for the glassware under inspection. Different glassware would have different representative lines, such as line S' and S''. The photocells 51a–58a are normally non-conducting and are biased so as not to conduct as long a shadow is present during test time. On the other hand, the photocells 51b–58b are normally conducting and continue to conduct until a shadow is present during test time.

In FIG. 4 is shown the shadow profile that is cast on the array of photocells 50 when the source of light 40 projects a beam of light along the leading edge E of the glassware A while the glassware A is rotating about its vertical axis. Should there be an outward deviation or configuration defect in the rotating glassware under test, then one or more of the photocells 51b–58b will become non-conducting during test time because of the shadow cast thereupon. Should there be an inward deviation or configuration defect in the rotating glassware under test, then one or more of the photocells 51a–58a will become conductive because of the brightness of the light cast thereupon. The inward or outward deviation is considered with respect to a standard profile or desired profile that conforms to the desired or acceptable configuration of the glassware A.

From the foregoing, it is to be observed that the source of light 40 projects a beam of light along the edge E of the glassware A, while the glassware A is rotating about its vertical axis. The rays of light are parallel to insure a sharp shadow pattern and to eliminate errors of parallex. The configuration of the ware, such as glassware, is inspected by light sensitive devices detecting the profile of the edge of the glassware, which profile will be in the form of a shadow cast upon the array of light sensitive devices 50. Since glassware contains multiple wall thickness along the leading edge thereof improved resolution is achieved for detecting outward and inward deviations.

Ware with no shape distortion will have a stationary pattern projecting on the array of photocells 50. If there is any distortion or defect in the shape of the ware undergoing inspection, the shadow cast upon the array of photocells 50 will appear to move across the face of the array of photocells 50. The amount the shadow moves across the face of the array of photocells 50 will be proportional to the magnitude of distortion. The movement of the shadow beyond prescribed limits is employed to detect distortions or defects in the configuration of the ware. It is the distance betwen each pair of photocells, such as photocells 51a–52b, 52a–52b, 53a–53b . . . 58a–58b that will reflect the allowable or acceptable deviations in the shape of the glassware. However, the glassware is disposed between the source of light 40 and the array of light sensitive devices 50 such that magnification of the deviation as represented by the shadow cast upon the array of photocells 50 would be considered.

The normally conducting photocells 51b–58b are connected to a conventional "and" logic circuit 60. Thus, while all the photocells 51b–58b remain in a conducting state, the output of the "and" logic circuit 60 will remain a logic 1 output. On the other hand, should one or more of the photocells 51b–58b change its state to a non-conductive mode, because of a detected distortion or defect in the shadow cast upon the array of photocells 50, then the output of the "and" logic circuit 60 will be a logic zero output.

The normally non-conducting photocells 51a–58a are connected to conventional inverter circuits 61–68, respectively. In turn, the inverter circuits 61–68 are connected to a conventional "and" logic circuit 70. Thus, while all the photocells 51a–58a remain non-conducting, the output signals therefrom will remain logic zero signals and the output signals from the inverter circuits 61–68 will remain logic 1 signals. Accordingly, the output signal from the "and" logic circuit 70 will remain a logic 1 signal.

Should one or more of the photocells 51a–58a change its state to a conducting mode, because of a detected distortion or defect in the shadow cast upon the array of photocells 50, then the output of one or more inverter circuits of the inverter circuits 61–68 will have a logic zero output. This, in turn, will cause the output of the "and" logic circuit 70 to have a logic zero output.

Connected to the "and" logic circuits 60 and 70 is a conventional "and" logic circuit 75. When the output signals from the "and" logic circuits 60 and 70 are logic 1 output signals, then the output signal from the "and" logic circuit 75 is a logic 1 output. In the event output signal from either the logic circuit 60 or the logic circuit 70 is a logic zero output, then the output signal from the "and" logic circuit 75 is a logic zero output. Should the output signals from the logic circuit 60 and 70 be logic zero signals, then the output signal from the "and" logic circuit 75 is a logic zero output.

Thus, should anyone or more of the photocells 51a–58a and 51b–58b change its state or mode because of the detected distortion or defect in the shadow cast upon the array of photocells 50, then the output signal from the "and" logic circuit 75 will be a logic zero signal. Should not one of the photocells 51a–58a and 51b–58b change its state or more, then the output signal from the logic circuit 75 will be a logic 1 output.

Connected to the "and" logic circuit 75 is a suitable decision circuit 80. The decision circuit 80 may control the operation of an indicator lamp 81 (FIG. 1) in a well-known manner or may control the operation of a solenoid operated gate, not shown, in a well-known manner. When the output signal of the "and" logic circuit 75 is a logic 1 output, the decision circuit 80 does not perform any control operation. Should the output signal of the "and" logic circuit 75 be a logic zero output, then the decision circuit 80 could cause the lamp 81 to be illuminated or cause the solenoid operated gate, not shown, to assume a reject position. A suitable switch 76 is actuated when the glassware A enters the inspection station to prepare the photocells 51a–58a and 51b–58b for operation in a well-known manner by completing their operating circuits.

In the operation of the apparatus 10 for inspecting the configuration of ware, units of glassware are advanced in a single file by the ware advancing section 12a of the conveyor 12 into the inspection station. The glassware while at the inspection station is rotated about its vertical axis through the action of the spin belt 35.

While glassware in the inspecting station is rotating about its vertical axis, rays of light from the vertical disposed source of light 40 is projected through the glassware under test along the leading upwardly directed edge thereof. As a consequence thereof, a shadow profile is cast upon the array of photocells 50.

The array of photocells 50 comprise the pair of photocells 51a–58a and 51b–58b, respectively. A line connecting intermediate points between each pair of photocells defines the desired or standard configuration for the glassware under inspection. Should there be an outward deviation or configuration defect in the rotating glassware under test, then one or more of the photocells 51b–58b will change its conduction state or mode. In the event there is an inward deviation or configuration defect in the rotating glassware under test, then one or more of the photocells 51a–58a will change its conduction state or mode. If there is no defect in configuration or deviation in the shape of the rotating glassware under test, then the photocells 51a–58a and 51b–58b will not change their state of conduction or mode. It is the distance between the photocells of each pair of photocells that determines the allowable or acceptable deviation in the shape of the glassware.

In the event not one of the photocells 51b–58b change its conduction state or mode, then the output of the "and" logic circuit 60 is a logic 1 signal. Similarly, should not one of the photocells 51a–58a change its conduction state or mode, then the output of the "and" logic circuit 70 is a logic 1 signal. As a consequence thereof, the output of the "and" logic 75 is a logic 1 signal. Therefore, the decision circuit 80 controls the operations of suitable circuits to indicate that the glassware under test is acceptable or to perform in a manner that the glassware advanced by the conveyor section 12b of the conveyor 12 to the succeeding station is an accepted ware.

On the other hand, should anyone or more of the photocells 51b–58b change its conduction state or mode, then the output from the "and" logic circuit 60 is a logic zero output signal. Likewise, if any one or more of the photocells 51a–58a change its conduction state or mode, then the output from the "and" logic circuit 70 is a logic zero output signal. If either the "and" logic circuit 60 or the "and" logic circuit 70 or both produce a logic zero output signal, then the output signal from the "and" logic circuit 75 will be a logic zero output. As a consequence thereof, the decision circuit 80 will control the operation of circuits to indicate a reject or operate a solenoid gate, not shown, to reject the glassware under test after the same has been advanced by the conveyor section 12b of the conveyor 12.

It is to be understood that modifications and variations of the embodiment of the invention disclosed herein may be resorted to without departing from the spirit of the invention and the scope of the appended claims.

Having thus described our invention, what we claim as new and desire to protect by Letters Patent is:

1. Apparatus for inspecting the configuration of an article for deviations from an acceptable shape comprising a source of light for projecting a beam of light; an array of light sensitive devices disposed in the path of the beam of light; means for rotating an article to be inspected about a generally vertical axis of symmetry while an upwardly directed edge of said article is disposed in the path of travel of said beam of light between said source of light and said array of light sensitive devices so that a shadow profile of the upwardly directed edge is cast towards the array of light sensitive devices being arranged in a plurality of pairs spaced about separate contours to be inspected along the shadow profile of the upwardly directed edge of an article of acceptable shape; each pair of light sensitive devices including one device positioned inward from a predetermined acceptable profile and one device positioned outward from a predetermined acceptable profile, with the spacing between devices defining acceptable deviation therebetween, an outward deviation in said shadow profile of the upwardly directed edge changing the state of at least one of said light sensitive devices on the outward side of said predetermined acceptable profile and an inward deviation in said shadow profile of the upwardly directed edge changing the state of at least one of said light sensitive devices on the inward side of said predetermined acceptable profile, a first logic circuit connected to said light sensitive devices on one side of said acceptable profile for producing a different logic output signal in response to one or more of said light sensitive devices on said one side of said acceptable profile changing its state; a second logic circuit connected to said light sensitive devices on the other side of said acceptable profile for producing a different logic output signal in response to one or more of said light sensitive devices on said other side of said acceptable profile changing its state, and circuit means operatively responsive to at least one of said logic circuits producing a different logic output signal.

2. Apparatus for inspecting the configuration of an article as defined in claim 1 wherein said circuit means comprises a third logic circuit connected to said first and second logic circuits for producing a different logic output signal in response to at least one of said logic circuits producing a different logic output signal, and a decision circuit operatively responsive to the logic output signal produced by said third logic circuit.

3. Apparatus for inspecting the configuration of an article as defined in claim 1 including a conveyor for conveying articles to and from said article rotating means, said source of light and said array of light sensitive devices being positioned on opposite sides of the conveyor with the path of the beam of light extending transversely thereof above the conveyor to inspect articles conveyed along the conveyor.

4. The apparatus of claim 3 including means for locating said article to be inspected so that the article's vertical axis of symmetry is concentric with the axis of rotation about which the article is rotated by said article rotating means.

References Cited

UNITED STATES PATENTS

| | | | |
|---|---|---|---|
| 2,402,405 | 6/1946 | Hurley | 88—14 |
| 2,415,178 | 2/1947 | Hurley | 88—14 |
| 2,571,974 | 10/1951 | Walker | 250—224 |
| 2,968,210 | 1/1961 | Perozzi et al. | 88—14 |
| 3,311,749 | 3/1967 | Briggs | 88—14 |

ARCHIE R. BORCHELT, Primary Examiner

M. ABRAMSON, Assistant Examiner

U.S. Cl. X.R.

250—224; 356—157